United States Patent [19]

Tsuchiya et al.

[11] Patent Number: 5,530,823
[45] Date of Patent: Jun. 25, 1996

[54] HIT ENHANCEMENT CIRCUIT FOR PAGE-TABLE-LOOK-ASIDE-BUFFER

[75] Inventors: Kenichi Tsuchiya, New Brighton, Minn.; Thomas J. Adelmeyer, Hillsboro, Oreg.

[73] Assignee: Unisys Corporation, Blue Bell, Pa.

[21] Appl. No.: 881,914

[22] Filed: May 12, 1992

[51] Int. Cl.$^6$ .................................................. G06F 12/10
[52] U.S. Cl. .................................................. 395/417
[58] Field of Search ........................ 395/250, 157, 395/400, 375; 364/200

[56] References Cited

U.S. PATENT DOCUMENTS

| | | | |
|---|---|---|---|
| 4,168,514 | 9/1979 | DeKarske | 365/230 |
| 4,458,310 | 7/1984 | Chang | 364/200 |
| 4,463,420 | 7/1984 | Fletcher | 364/200 |
| 4,464,712 | 8/1984 | Fletcher | 364/200 |
| 4,464,717 | 8/1984 | Keeley et al. | 364/200 |
| 4,602,368 | 7/1986 | Circello et al. | 371/21 |
| 4,607,331 | 8/1986 | Goodrich, Jr. et al. | 364/200 |
| 4,695,950 | 9/1987 | Brandt et al. | 364/200 |
| 4,783,735 | 11/1988 | Miu et al. | 364/200 |
| 4,785,395 | 11/1988 | Keeley | 364/200 |
| 4,811,209 | 3/1989 | Rubinstein | 364/200 |
| 4,905,139 | 2/1990 | Asai et al. | 364/200 |
| 4,914,582 | 4/1990 | Bryg et al. | 364/200 |
| 4,928,239 | 5/1990 | Baum et al. | 364/200 |
| 4,945,512 | 7/1990 | DeKarske et al. | 365/49 |
| 4,967,414 | 10/1990 | Lusch et al. | 371/51.1 |
| 4,980,814 | 11/1990 | Fukuzawa et al. | 364/200 |
| 4,980,816 | 12/1990 | Fukuzawa et al | 364/200 |
| 4,985,848 | 1/1991 | Pfeiffer et al. | 364/518 |
| 4,996,641 | 2/1991 | Talgam et al. | 364/200 |

*Primary Examiner*—David K. Moore
*Assistant Examiner*—Jack A. Lane
*Attorney, Agent, or Firm*—John B. Sowell; Mark T. Starr; Charles A. Johnson

[57] ABSTRACT

A virtual memory computing system is provided with a novel table-look-aside-buffer (TLB). The table-look-aside-buffer is located in cache memory and provides high speed verification that a page address being accessed by the instruction processor is present in the high speed mass storage unit (MSU) of the computer system. In the event of a page miss in the TLB, the control circuits associated with the TLB fetch a page descriptor and generate a translated real page address which is stored in the TLB in an invalidated (decelerated) or non-degraded and least recently used address.

9 Claims, 5 Drawing Sheets

HIT ENHANCEMENT CIRCUIT FOR PAGE-TABLE-LOOK-ASIDE-BUFFER

BACKGROUND OF THE INVENTION

1. Related Applications

The present invention is related to our U.S. application Ser. No. 07/991,915 filed May 12, 1992 for a Least Recently Used Four Block Cache Logic System.

2. Field of the Invention

The present invention relates to high speed instruction processors (IPs) that employ high speed cache memory with page-table-look-aside-buffers (TLBs). More particularly, the present invention relates to logic circuitry for managing page-table-look-aside-buffers (TLBs) employed in high speed computing system that use virtual memory main storage units (MSUs).

2. Description of the Prior Art

Large high speed mainframe computers are provided with one or more instruction processors (IPs) in a system that is operable to access one or more main storage units (MSUs). Virtual memory main storage units are under the control of the IPs executive operating system software and are capable of replacing portions of the MSU with data and commands stored in slower but larger mass storage devices. In such large main frame computing systems, the instruction processor may desire to reference a block or blocks of words that do not presently reside in its own high speed primary cache memory. If the words being referenced are not found in the cache memory when an attempt to access the information occurs, the instruction processor must wait in an idle state until the desired word or words in the block or blocks of information is transferred from an MSU to the cache memory of the IP. In a virtual memory processor if the word or words referenced by the IP are not resident in the MSU, then the executive operating system and the control unit of the MSU must fetch a page of words from a slower but larger mass storage device and write the page of words into the MSU where they can be transferred as a block of words to the cache memory of the IP in the form of data and/or commands.

A missed attempt by the IP to reference a word not in its cache memory is nevertheless a missed hit that degrades the performance of the IP. The hit rate of the IP to the cache memory is enhanced by replacing the word portions of the cache memory that was least recently used (LRU) when new information is written into the cache from an MSU. In our aforementioned U.S. application Ser. No. 07/881,915 further enhancement is accomplished by logic circuitry that will write new information into an invalidated memory location of the cache memory first but not a degraded memory location.

When the IP references a page of information not found in its own MSU, a much longer delay occurs for the program presently being run while the page is fetched from a mass storage device in the form of a page of information. To fetch a page, the IP issues an absolute address which is translated in translator circuits of the cache memory of the IP to provide a system real address which contains a translated real page address that is stored in a table. If the system real address does not reside in the table-look-aside-buffers (TLB), it must be translated and written into the TLB. The translation process is lengthy, thus degrades the IPs performance when a new page of information is required.

It would be highly desirable to provide a method and logic means for enhancing the hit rate of the IP absolute addresses in the TLB in order to increase the performance of the IP by increasing the chance that the real page address has been previously translated and resides in the TLB.

SUMMARY OF THE INVENTION

It is a primary object of the present invention to provide a method and apparatus for enhancing the hit rate of the IP addresses being translated in a table-look-aside-buffer (TLB).

It is another principal object of the present invention to provide a simplified logic structure for generating aging information for page addresses in a table-look-aside-buffer.

It is another principal object of the present invention to provide a simplified least recently used (LRU) logic circuit for table-look-aside-buffer addresses.

It is another principal object of the present invention to provide a novel circuit for generating validity and degrade information for page addresses being accessed in a table-look-aside-buffer.

It is another primary object of the present invention to increase the hit rate of IP addresses in a TLB by first writing translated page address information into invalidated page address locations in the TLB.

It is another primary object of the present invention to enhance the hit rate of IP addresses in the TLB by writing translated page address information into the least recently used page address locations in the TLB.

It is another primary object of the present invention to increase the hit rate of IP addresses in a TLB by writing translated page address information into degraded locations in the TLB.

According to these and other objects of the present invention, there is provided a least recently used logic circuit for a table-look-aside-buffer register which encodes in binary format aging information, degrade information, and validity information which is employed to generate a least recently used page address to be used for writing a new page address entry in a TLB after translation.

DESCRIPTION OF THE PREFERRED EMBODIMENT

Figure 1:
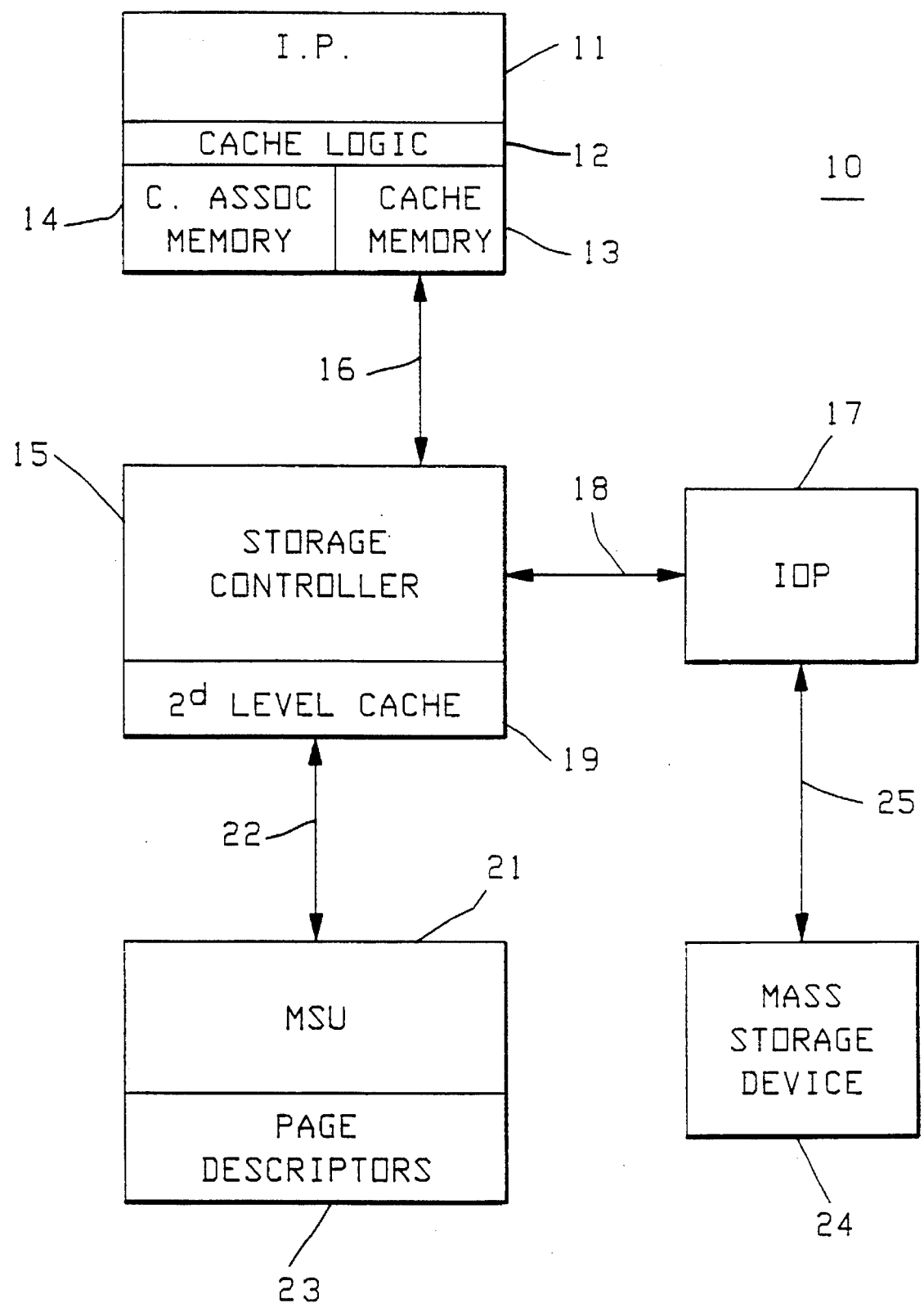
FIG. 1 is a schematic block diagram of a high speed mainframe computing system showing an instruction processor (IP) and different types of memory units.

Refer now to FIG. 1 showing a block diagram of the major portions of a high speed mainframe computing system 10 which comprises an instruction processor 11 having a cache logic portion 12, a cache memory 13 and a cache associated memory section 14. The IP 11 is coupled to a storage controller 15 by a conventional cable 16. Controller 15 is coupled to an input/output processor (IOP) 17 by a conventional cable 18. In the preferred embodiment of the present invention the storage controller 15 is provided with a second level cache memory portion 19 which is operatively connected to a main storage unit 21 via a conventional cable 22. Cache 19 is effectively a high speed MSU cache or buffer. The MSU 21 is shown having a page descriptor block 23 which contains a description of every page residing in the MSU. The page descriptor 23 is used in the translator to be described hereinafter.

When the instruction processor 11 attempts to reference a word or words that do not reside in the cache memory 13 or the second level cache 19 or the MSU 21, then it is necessary for the program to wait until its executive operating system is able to obtain a page of information from the mass storage device 24 and bring the page of information via cable 25, IOP 17, cable 18, storage controller 15, second level cache 19 and cable 22 into the MSU 21 as blocks of information which contains the referenced information. While the IOP 17 is fetching the page from mass storage 24 to be written into MSU 21, the IP 11 is employed to perform other programs and does not remain in an idle state.

The cache memory 13, 14 of the preferred embodiment system contains a portion of memory dedicated to data storage for blocks of words which are accessible at high speeds by the IP. In addition to data storage, the cache memory 13, 14 contains an associated TAG memory and a separate memory portion for validity, degradation and the least-recently-used (LRU) blocks. The cache memory 13, 14 also contains the table-look-aside-buffer (TLB), but due to limitations of the size of the high speed cache memory 13, 14, no separate memory portion is provided for validity, degradation and age information for the information stored in the TLB. As will be explained in greater detail hereinafter, the TLB is arranged similar to a two block data cache and it is possible with the aid of novel logic circuitry to generate and store validity, degrade and age information in three of the address bits of the TLB so that newly translated page addresses are not stored in degraded address locations and are only stored either in an invalidated (or decelerated) location or in the LRU address location of the TLB.

Figure 2:
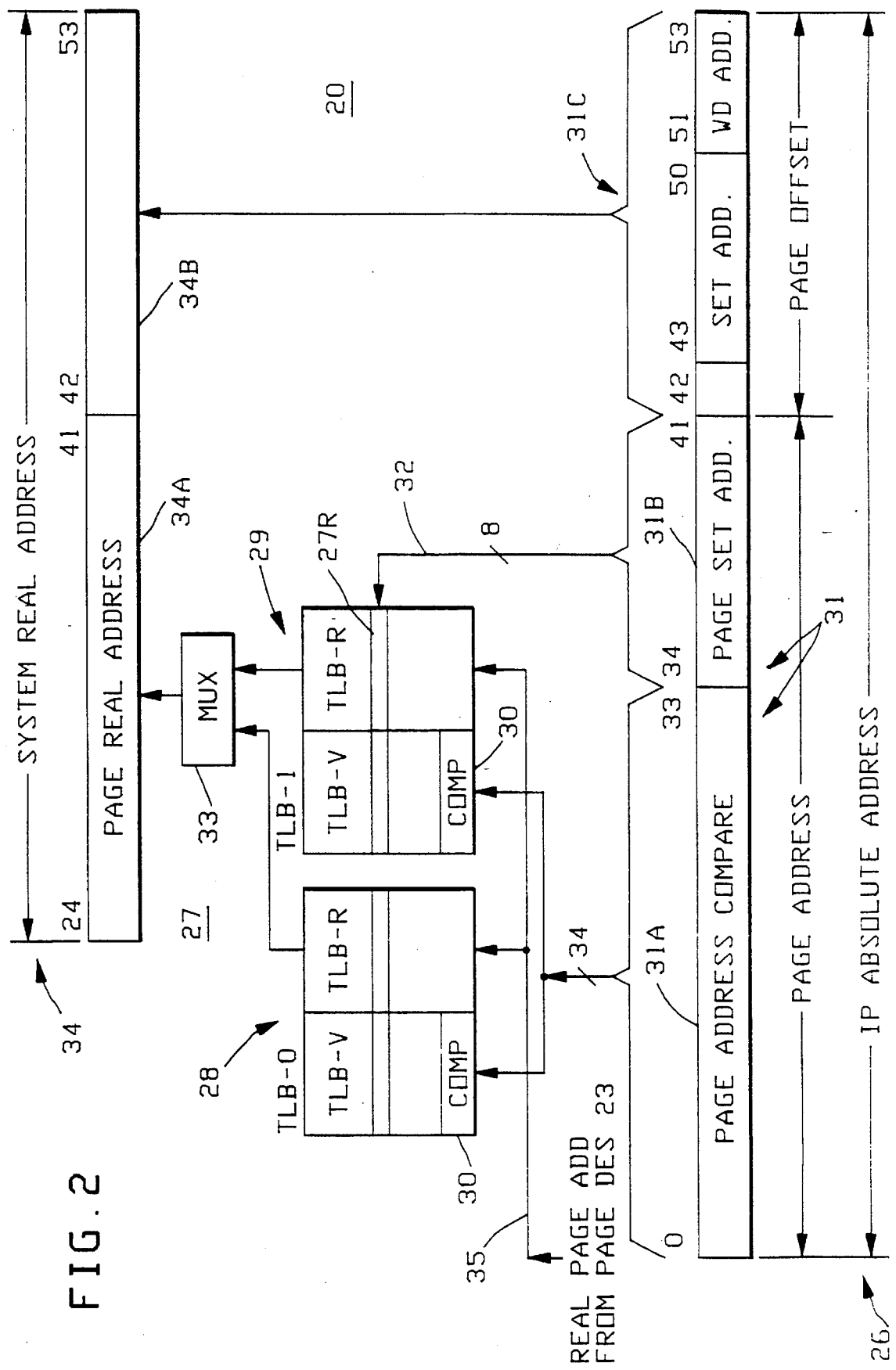
FIG. 2 is a schematic block diagram showing the IP cache's page addressing structure for a large mainframe computing system of the having a table-look-aside-buffer memory.

Refer now to FIG. 2 showing the instruction processor cache's addressing structure and translator 20 for a large mainframe computer of the type having a table-look-aside-buffer. When the IP 11 executes an instruction, it generates an absolute address or addresses of commands and data in the form of a preferred embodiment absolute address shown as block 26. In the preferred embodiment explained for this invention, the absolute address 26 contains 54 bits numbered 0 to 53. The page address 31 comprises bits 0 through 41, which includes the page address compare 31A at bits 0 to 33 and the page set address 31B at bits 34 to 41. The page set address is used to point to and access the page addresses and real page address in the table-look-aside-buffer 27. Buffer 27 comprises a TLB-0 side 28 and a TLB-1 side 29 which will be explained in greater detail hereinafter.

The page address compare portion 31A of an absolute address 26 is compared in comparator 30 with the TLB-V virtual portions addressed by the page set address 31B on line 32. When the comparison matches, the real page address portions, shown as TLB-R, will be selected by the mux 33 as the real page address portion 34A of the system real address 34 (in register 34A). When the page address compare portion 31A matches the TLB-V portion at side 29, the mux 33 selects the TLB-R portion from TLB-1 at side 29. However, if the page address compare portion 31A matches the TLB V portion at side 28, the mux 33 selects the TLB-R portion from side 28 for the real page address 34A the system real address 34. In the preferred embodiment, the system real address 34 is shown comprising page real address bits 24 through 41 and page offset bits 42 through 53. The page offset bits are supplied directly by the page offset portion 31C of the IP absolute address 26 to the page offset portion 34B (in register 34B). When the page address compare portion 31A does not compare with one of the TLB-V portions of TLB 27 at the page set address on line 32, there is a miss and the information desired is not contained in memory or in the table 27. The translator 20 in the IP must translate the absolute address into a real page address. A real page address on line 35 is obtained from a page descriptor such as page descriptor 23 shown in FIG. 1 and the real page address is written into the TLB-R side while the page address compare portion 31A is written into the TLB-V side to complete the new address written into TLB 27. At the same time the aforementioned address is written into the TLB 27, the validity, degrade and aging bits will be generated and written into same memory at portions to be described in more detail hereinafter. The newly written address which is placed in TLB 27 is written over an invalidated location or a least recently used location as will be explained in greater detail. Degraded locations are not used.

Figure 3:
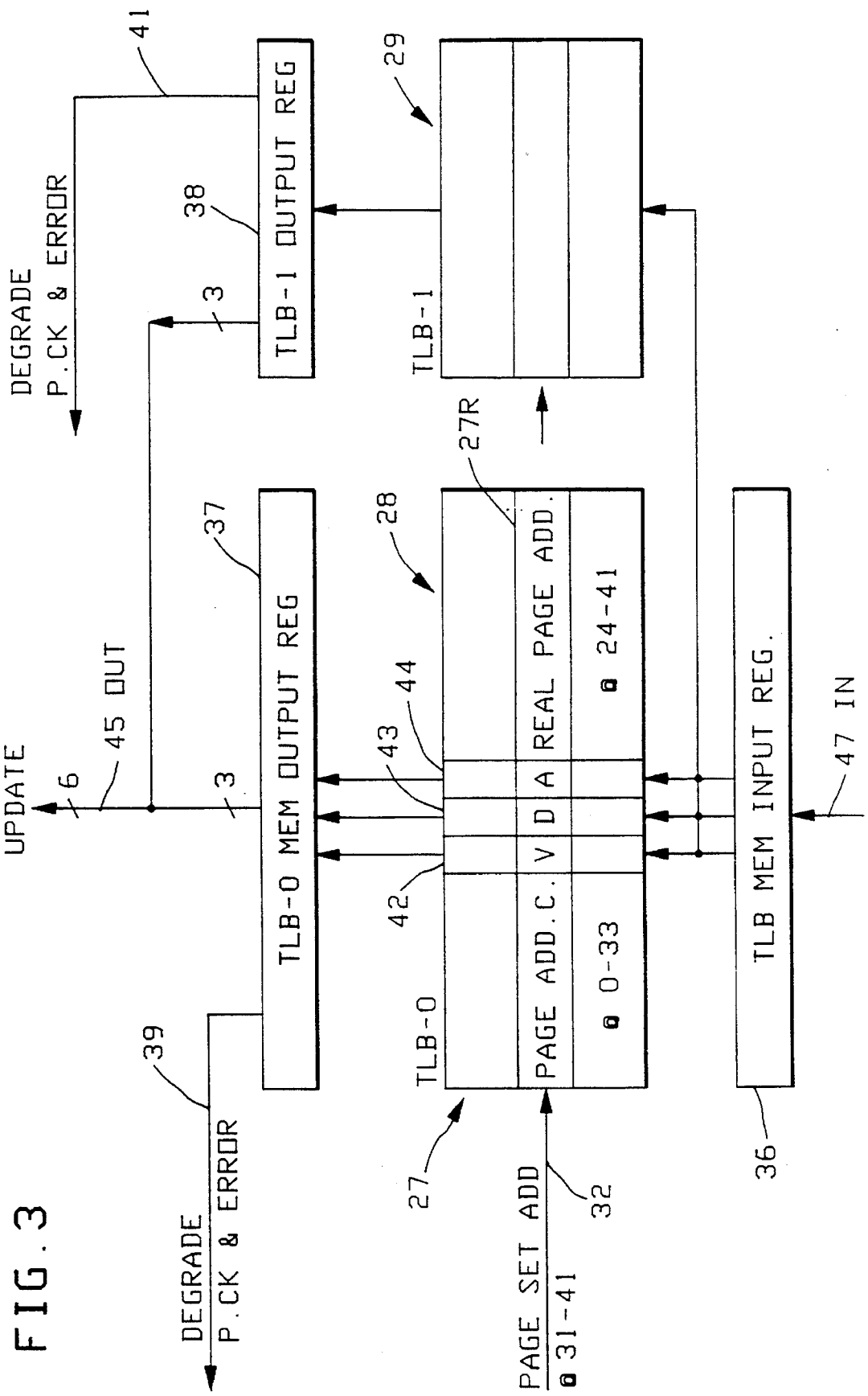
FIG. 3 is a schematic block diagram of the table-look-aside-buffer in the cache associated memories of FIG. 1.

Refer now to FIG. 3 showing a schematic diagram of the table-look-aside-buffer 27 which comprises the TLB-0 side 28 and the TLB-1 side 29. The TLB 27 also comprises memory registers 27R, a TLB memory input register 36 and a TLB-0 memory output register 37 which serve as input and output buffers for the TLB-0 side 28. The TLB-1 side 29 uses the input register 36 and requires a TLB-1 output register 38. The TLB-0 memory output register 37 has associated circuitry which generates a TLB-0 parity check and error signal on line 39 used as degrade information. The TLB-1 output register 38 has associated circuitry which produces a TLB-1 parity check and error signal on line 41. The three bit outputs from the output registers 37 and 38, which appear on line 45 as six bits are applied as input information to the age information update circuitry to be explained in greater detail hereinafter. There are stored three bits in locations 42, 43 and 44 of TLB 27 identified as the validity (V), degrade (D), and aging bits (A) which are generated in logic circuitry to now be explained.

Figure 4:
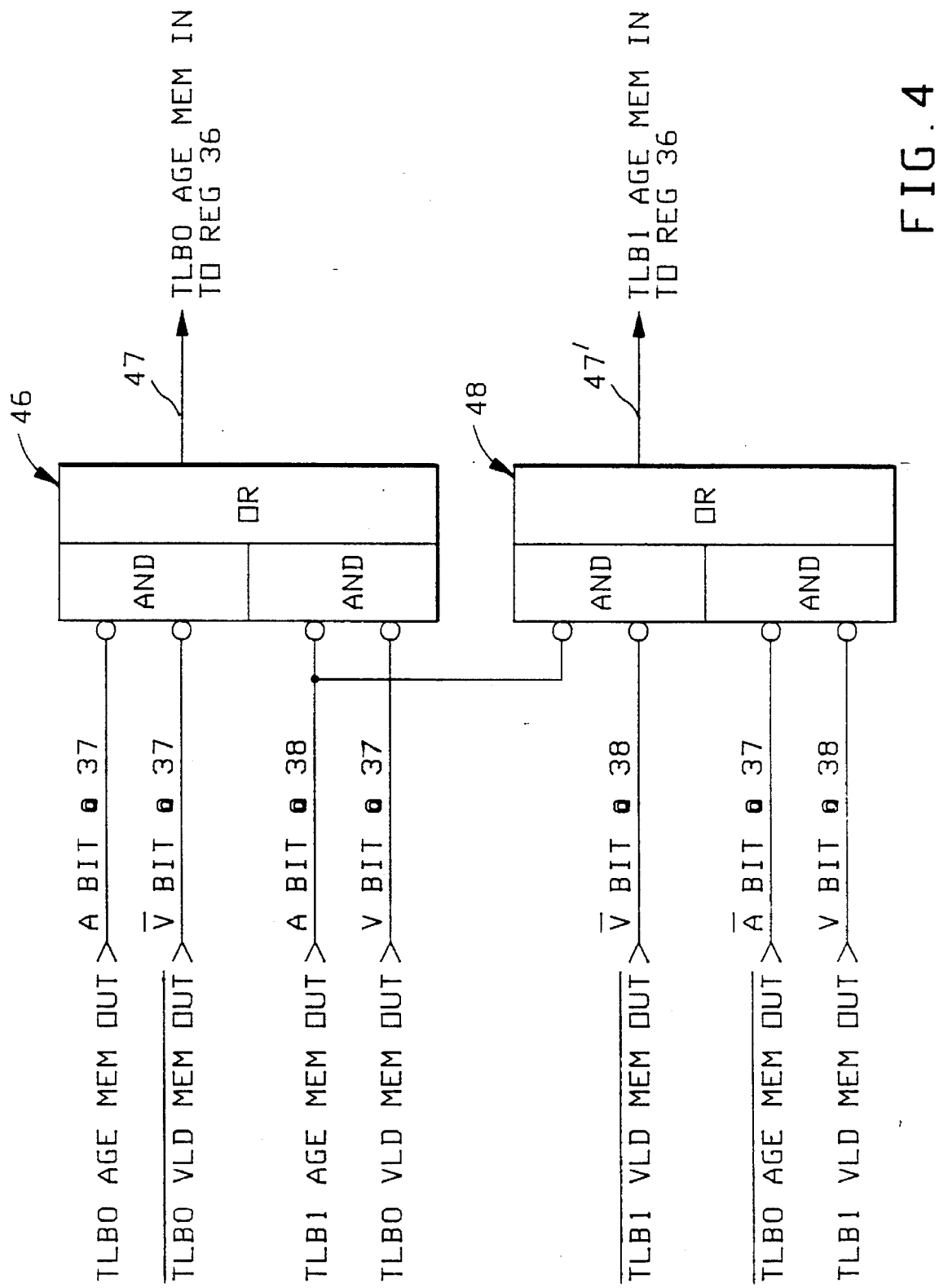
FIG. 4 is a schematic block diagram of the TLB age information update logic circuit of the cache logic of FIG. 1.

Refer now to FIGS. 3 and 4 showing a schematic block diagram of the logic circuitry which generates the age update information. The V, D and A bits in locations 42, 43 and 44 of FIG. 3 are buffered in register 37 and presented on output line 45 as 3 bits from the real TLB-0 side 28 and 3 bits from the real TLB-1 side 29. The age and validity bit information from registers 37 and 38 is shown being applied to the AND/OR gate 46 to produce the TLB-0 age bit which is recirculated and applied to the input register 36 via line 47. Similarly the age and validity bit information from output registers 37 and 38 are shown being applied to AND/OR gate 48 to produce the TLB-1 age bit information on line 47, which is applied to the register 36 via line 47. It will be understood that the input information shown being applied to the AND/OR gates 46 and 48 is actually generated at registers 37, 38 on line 45 shown having 6 bits in FIG. 3.

Figure 5:
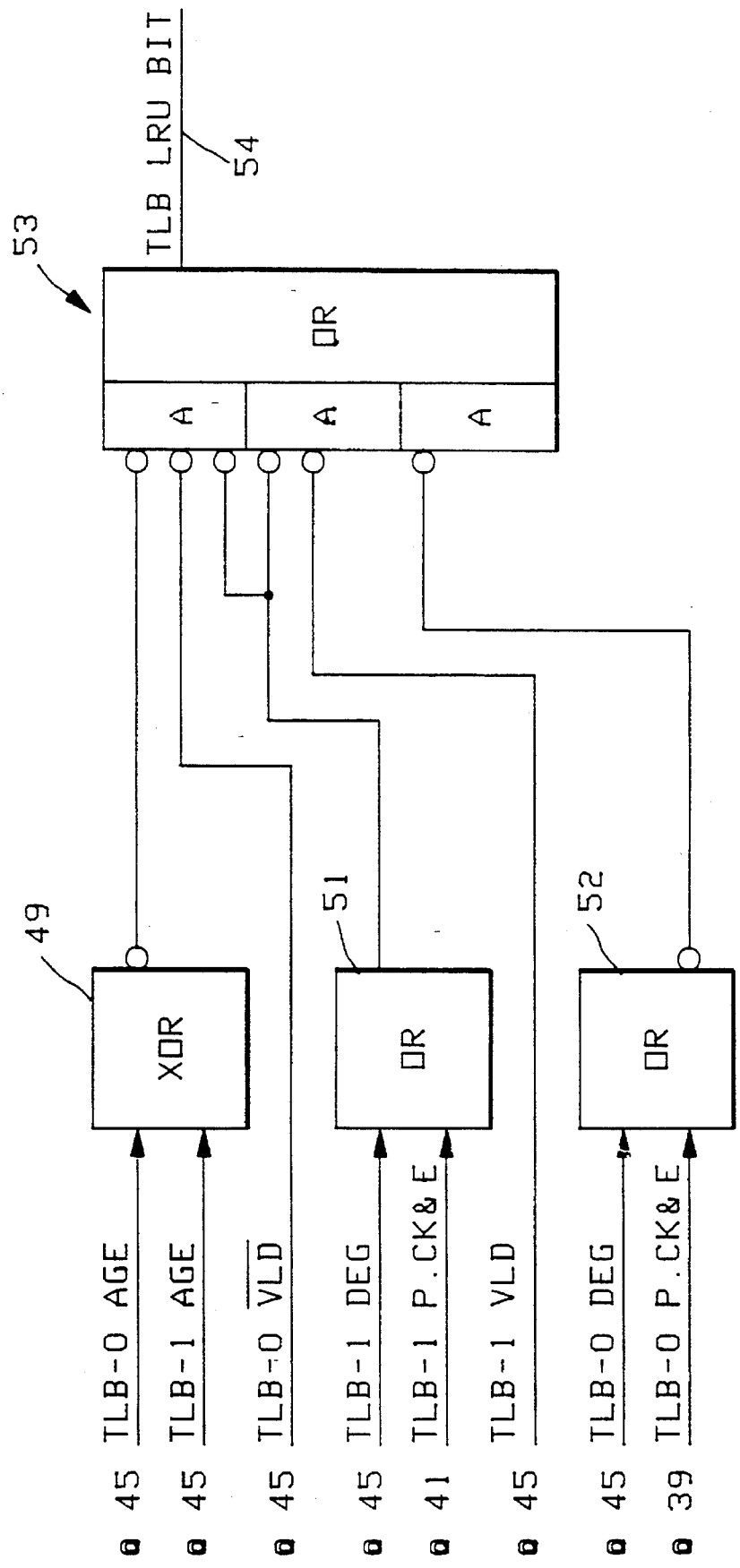
FIG. 5 is a schematic block diagram of the logic circuit for generalizing the least recently used (LRU) age address in the table-look-aside-buffer (TLB).

Refer now to FIG. 5 showing a schematic block diagram of the logic circuit used for generating the least recently used (LRU) page address information in the TLB 27. The inputs from lines 45, 39 and 41 are shown being applied to exclusive OR gate 49, and to OR gates 51 and 52, respectively, which produce outputs that are applied to the AND/OR gate 53 to produce the TLB LRU bit on line 54 which is employed to control the circuitry of FIG. 2 and FIG. 3 for writing into the TLB 27 after the page translation is complete. The signal on line 54 is employed as an enable to select TLB-0 side 28 or the TLB-1 side 29, and is not shown on FIG. 2.

Having explained a preferred embodiment of the present invention, it will be understood that high speed computing systems having different system real addresses which differ from the IP absolute address will require a translator 20 to accomplish the logic of the type shown in FIGS. 2 and 3. Since TLB 27 operates as a look up table which does not contain all of the possible addresses in the MSU, it is necessary to update the TLB 27 with new addresses when a hit does not occur. Accordingly, it is desirable to enhance or optimize the hit rate in the TLB 27 if possible. This is accomplished by the novel circuitry which produces the aging and validity information explained hereinbefore. The validity information is produced by the IP cache hardware logic circuitry after a page translation has occurred and is available as an input to the circuitry shown in FIGS. 4 and 5. The executive operating system software will invalidate absolute address entries in the TLB when it decelerates those pages into the mass-storage 24 of FIG. 1. Further, the degrade information produced on lines 39 and 41 of FIG. 3 serves as the degrade input information on line 47 to update the degrade bit in location 43.

In the preferred embodiment of the present invention, there is more than one IP 11 in a computing system, however, the present invention is more easily explained using the illustration of a single IP (one-by system).

In computer terminology, a "hit" in cache memory 13 means that IP has accessed a block of information in cache memory that is resident in cache memory 13. If the second level cache 19 contains the block of information referenced by the IP that is not in the cache 13, a "miss" occurs. A "hit" in TLB means that a page address is already translated and accelerated into the TLB.

If the block or blocks of information referenced by the IP is NOT In cache memory 13, then it must be fetched from the second level cache 19 in the form of blocks or fetched from the MSU 21 or mass storage 24, where it is stored in the form of pages comprising thousands of blocks of information.

The IP executive operating system generates absolute addresses, however, the storage controller and system apparatus external to the IP requires a real system address for accessing the second level cache 19, the MSU 21, or the mass storage 24, as the case may be, when a cache miss occurs.

The present invention is concerned with the table-look-aside-buffer (TLB) and translator 20 shown in FIG. 2 which receives the IPs absolute address 26 and is adapted to generate the aforementioned system real addresses. If the IPs absolute address information is already stored in the TLB 20 when the same address is raised for access again, then the page set address bits 34 to 41 of the absolute address on line 32 points to a previously "translated" address stored in the TLB-0 side 28 or the TLB-1 side 29. The page address compare bits 0 to 33 of the IP absolute address will be compared with information stored in the virtual (V) side of TLB-0 or TLB-1. At the time of the comparison, the real page address 34A (translated tag match address) is read into bits 24 to 41 of buffer 34 and the page offset bits 42 to 53 of the IP absolute address 26 are read into bit positions 42 to 53 of the system real address 34. The system real address is then ready for use in accessing the system external to the IP or searching the IP cache TAG for a data block. In order to enhance subsequent hits, validity bits (V) from the IP are stored in TLB 27. Information concerning the validity (V), degrade (D), and age (A) for the page address are stored in cells 42 to 44. The validity bit is produced by the IP cache 13 logic hardware. The degrade bit is produced on lines 39 and 41 shown in FIG. 3. The aging bit is produced on lines 47 shown in FIG. 4, and stored in registers 36 and 38.

The LRU signal(s) on line 54 are generated by the logic of FIG. 5 and are only used as enable signals to point at the side of the TLB buffer which is the oldest.

If the address being accessed is degraded, it cannot be used. The aging bit is used to update the system real address and is only used when a new translation occurs.

In summary, when the IP absolute address 26 makes a hit in TLB 27, the page address stored in TLB 27 is used as a previously translated address to generate a real page address unless inhibited by validity bit not set or degrade bit set.

However, if a miss occurs, a new real page address on line 35 is transferred into TLB 27 and is translated as described hereinbefore with reference to FIGS. 2 and 3, and is stored in the TLB memory output register prior to being stored in register 34 as a real page address 34A. After the IP has translated the real page address on line 35, it is stored in the TLB 27 at the LRU page set address on line 32 if, and only if, it is not degraded. If invalid or degraded, the address cannot be used.

In the preferred mode of operation, each data block in the cache 13 will be accompanied by an associated block address in an associative memory 14. When a read or write reference to cache is made, the block address will be checked against four bank addresses obtained from an associated Tag storage associative memory of the type set forth in U.S. application Ser. No. 07/881,915. If a "miss" (no match) occurs, the Tag storage will request the IP to hold or delay the request and the second level cache (SLC) 19 is checked, however, if a "miss" occurs on write reference, the data will be bypassed for a subsequent write operation.

Here, the associated TAG memory is employed as a storage for real address bits 24 through 42 of the system real address 34. When a read or write reference to cache is made, the address will be checked against a page address in the table-look-aside-buffer memory 27. Two 256 deep TLBs for each cache are provided. The page set address 31B of the IP absolute address 31 serves as a pointer on line 32 to TLB 27 to determine if the page address compare 31A is stored in the MSU 21. When a page hit occurs, it confirms that the real page address 34A is in the MSU 21 and a system real address 34 is generated to permit the storage controller 15 to access MSU 21.

If a page fault occurs, the page referenced by the IP 11 is not in the MSU 21 and the page referenced will have to be retrieved from mass storage 24. In this event, the program execution will stop and send a page fault interrupt request to the IP 11. A page fault also bypasses the aforementioned data block reference check to cache mentioned above, allowing the IP to proceed with other tasks. The executive operating system of the IP and the IOP 17 will fetch the reference page from the mass storage 24 and write it into the MSU 21, where it is available to the cache memory 13 or the second level cache 19.

Having explained the details of FIG. 2 through 5, it will now be appreciated that the 3 bits shown in locations 42, 43 and 44 occupy only 3 bits of the TLB 27 and do not require a separate memory unit in the associated cache memories. Thus, the information used to optimize the hit rate in the TLB is virtually free and does not require a separate memory. Just as important is the fact that the degrade, validity and age information is available on initial access to the TLB of a newly translated address.

What is claimed is:

1. A bit enhancement circuit for a page-table-look-aside-buffer (TLB) in a virtual memory computing system comprising:

an input buffer register for receiving an absolute address from an instruction processor, said absolute address comprising a page compare address, a page set address and a page offset address, an address input pointer coupled to said page address and to said TLB for accessing a memory address in said TLB, memory storage means in said TLB containing stored memory addresses to be accessed by said input pointer, dynamic bit storage means in said memory storage means at each said input pointer location, said dynamic bit storage means in said TLB comprising means for storing validity, degrade and age bit information capable of inhibiting access to a page address stored at the memory address to be accessed, logic circuit means coupled to said TLB for generating and storing said validity, degrade and age bit information in said dynamic bit storage means, said logic storage means including means for generating said degrade bit information comprising a parity check input and an error input, and means for comparing said page compare address with the contents of said memory address to be accessed, and selection means coupled to the memory storage means in said TLB at the address to be accessed for reading a translated real page address from said TLB upon a successful comparison of the page compare address and said memory address to be accessed when not inhibited by degrade and validly bit information in said dynamic bit storage means.

2. A hit enhancement circuit as set forth in claim 1 which further includes a real page address register coupled to said TLB for storing said translated real page address in said TLB.

3. A hit enhancement circuit as set forth in claim 2 which further includes a page offset register coupled to the page offset address of said input buffer register.

4. A hit enhancement circuit as set forth in claim 3 wherein said the contents of said page offset register and said real page address register comprise a system real address for accessing a computing system memory external to a cache memory.

5. A hit enhancement circuit as set forth in claim 1 wherein said logic circuit means for generating said validity information comprises an input from said instruction processor (IP) indicating that the page address being accessed has been previously accessed by the IP.

6. A hit enhancement circuit as set forth in claim 1 wherein said logic circuit means (FIG. 4) for generating said age information comprises means for inverting an old age bit to provide a new age bit.

7. A bit enhancement circuit as set forth in claim 1 wherein said logic circuit means comprises means for generating a least recently used (LRU) age bit and wherein said TLB comprises a TLB-0 and a TLB-1 side, said LRU age bit being coupled to an enable input to select either said TLB-0 or said TLB-1 side of said TLB, and said logic circuit means comprising an AND/OR gate having logic degrade, validity and age information inputs for generating said LRU age bit.

8. A hit enhancement circuit as set forth in claim 1 which further includes page descriptor means coupled to said table-look-aside-buffer for generating a real page address to be stored in said memory location of said TLB at a new page set address.

9. A hit enhancement circuit as set forth in claim 8 which further includes logic circuit means for generating validity, degrade and age information to be stored with said page address to provide a translated real page address in said TLB when a page miss occurs.

* * * * *